United States Patent
Steely, Jr. et al.

(10) Patent No.: US 7,406,565 B2
(45) Date of Patent: *Jul. 29, 2008

(54) MULTI-PROCESSOR SYSTEMS AND METHODS FOR BACKUP FOR NON-COHERENT SPECULATIVE FILLS

(75) Inventors: Simon C. Steely, Jr., Hudson, NH (US); Gregory Edward Tierney, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 824 days.

This patent is subject to a terminal disclaimer.

(21) Appl. No.: 10/756,637

(22) Filed: Jan. 13, 2004

(65) Prior Publication Data

US 2005/0154865 A1    Jul. 14, 2005

(51) Int. Cl.
*G06F 9/00* (2006.01)
*G06F 9/38* (2006.01)
*G06F 13/00* (2006.01)

(52) U.S. Cl. .................. 711/119; 711/118; 711/117; 711/146; 711/141; 711/100; 712/217; 712/216; 712/1

(58) Field of Classification Search .............. None
See application file for complete search history.

(56) References Cited

U.S. PATENT DOCUMENTS

| | | | |
|---|---|---|---|
| 5,197,132 A | 3/1993 | Steely, Jr. et al. | |
| 5,222,224 A | 6/1993 | Flynn et al. | |
| 5,404,483 A | 4/1995 | Stamm et al. | |
| 5,420,991 A * | 5/1995 | Konigsfeld et al. | 711/150 |
| 5,491,811 A * | 2/1996 | Arimilli et al. | 711/144 |
| 5,519,841 A | 5/1996 | Sager et al. | |
| 5,625,829 A | 4/1997 | Gephardt et al. | |
| 5,651,125 A * | 7/1997 | Witt et al. | 712/218 |
| 5,721,855 A | 2/1998 | Hinton et al. | |
| 5,802,577 A | 9/1998 | Bhat et al. | |
| 5,829,040 A | 10/1998 | Son | |
| 5,845,101 A | 12/1998 | Johnson et al. | |
| 5,875,467 A | 2/1999 | Merchant | |
| 5,875,472 A | 2/1999 | Bauman et al. | |
| 5,958,019 A | 9/1999 | Hagersten et al. | |
| 6,032,231 A | 2/2000 | Gujral | |
| 6,055,605 A | 4/2000 | Sharma et al. | |
| 6,081,887 A | 6/2000 | Steely, Jr. et al. | |

(Continued)

OTHER PUBLICATIONS

Vijaykumar et al. Speculative Versioning Cache. IEEE Transactions on parallel and distributed systems. vol. 12. No. 12, Dec. 2001.*

(Continued)

*Primary Examiner*—Sanjiv Shah
*Assistant Examiner*—Sam Dillon

(57) ABSTRACT

Multi-processor systems and methods are disclosed. One embodiment may comprise a multi-processor system comprising a processor having a processor pipeline that executes program instructions with data from a speculative fill that is provided in response to a source request, and a backup system that retains information associated with a previous processor execution state corresponding to an instruction associated with the speculative fill. The backup system may initiate a backup of the processor pipeline to the previous processor execution state if the speculative fill is determined to be non-coherent, and the processor pipeline may continue execution of program instructions if the speculative fill is determined to be coherent.

41 Claims, 9 Drawing Sheets

U.S. PATENT DOCUMENTS

| | | | |
|---|---|---|---|
| 6,085,263 | A | 7/2000 | Sharma et al. |
| 6,108,737 | A | 8/2000 | Sharma et al. |
| 6,134,646 | A | 10/2000 | Feiste et al. |
| 6,151,671 | A | 11/2000 | D'Sa et al. |
| 6,209,065 | B1 | 3/2001 | Van Doren et al. |
| 6,275,905 | B1 * | 8/2001 | Keller et al. ................. 711/141 |
| 6,286,090 | B1 | 9/2001 | Steely, Jr. et al. |
| 6,301,654 | B1 | 10/2001 | Ronchetti et al. |
| 6,317,811 | B1 | 11/2001 | Deshpande et al. |
| 6,345,342 | B1 | 2/2002 | Arimilli et al. |
| 6,349,382 | B1 | 2/2002 | Feiste et al. |
| 6,356,918 | B1 | 3/2002 | Chuang et al. |
| 6,408,363 | B1 | 6/2002 | Lesartre et al. |
| 6,412,067 | B1 | 6/2002 | Ramirez et al. |
| 6,457,101 | B1 | 9/2002 | Bauman et al. |
| 6,493,802 | B1 * | 12/2002 | Razdan et al. .............. 711/144 |
| 6,535,941 | B1 | 3/2003 | Kruse |
| 6,553,480 | B1 | 4/2003 | Cheong et al. |
| 6,574,712 | B1 | 6/2003 | Kahle et al. |
| 6,591,348 | B1 | 7/2003 | Deshpande et al. |
| 6,594,821 | B1 | 7/2003 | Banning et al. |
| 6,615,343 | B1 | 9/2003 | Talcott et al. |
| 6,633,960 | B1 | 10/2003 | Kessler et al. |
| 6,633,970 | B1 * | 10/2003 | Clift et al. ................... 712/217 |
| 6,651,143 | B2 | 11/2003 | Mounes-Toussi |
| 6,775,749 | B1 * | 8/2004 | Mudgett et al. ............. 711/146 |
| 7,234,029 | B2 * | 6/2007 | Khare et al. ................ 711/146 |
| 2001/0055277 | A1 | 12/2001 | Steely, Jr. et al. |
| 2002/0009095 | A1 | 1/2002 | Van Doren et al. |
| 2002/0099833 | A1 | 7/2002 | Steely, Jr. et al. |
| 2002/0099913 | A1 | 7/2002 | Steely, Jr. |
| 2002/0146022 | A1 | 10/2002 | Van Doren et al. |
| 2002/0194290 | A1 | 12/2002 | Steely, Jr. et al. |
| 2002/0194436 | A1 | 12/2002 | McKenney |
| 2002/0199067 | A1 * | 12/2002 | Patel et al. .................. 711/145 |
| 2003/0069902 | A1 | 4/2003 | Narang et al. |
| 2003/0145136 | A1 | 7/2003 | Tierney et al. |
| 2003/0195939 | A1 | 10/2003 | Edirisooriya et al. |

OTHER PUBLICATIONS

M. H. Lipasti. C. B. Wilkerson. and J. P. Shen. Value locality and load value prediction. Sigplan Notices, 31(9). 1996.*

T. Sato, K. Ohno, and H. Nakashima. "A Mechanism for Speculative Memory Accesses Following Synchronizing Operations," in Proc. of Intl. Parallel and Distributed Processing Symp. IPDPS00. May 2000.*

M. Cintra, J. F. Martnez, and J. Torrellas. Architectural support for scalable speculative parallelization in shared-memory multiprocessors. In Proceedings of the 27th Annual International Symposium on Computer Architecture. Jun. 2000.☐☐.*

Rajiv Gupta. The fuzzy barrier: A mechanism for high speed synchronization of processors. In Proceedings of the Third International Conference on Architectural Support for Programming Languages and Operating Systems (ASPLOS III). 1989. ACM Press.*

Jin Lin, Tong Chen, Wei-Chung Hsu, Pen-Chung Yew, Speculative register promotion using Advanced Load Address Table (ALAT), Proceedings of the international symposium on Code generation and optimization: feedback-directed and runtime optimization, Mar. 23-26, 2003, San Francisco, California.*

Gharachorloo, et al., "Memory Consistency and Event Ordering in Scalable Shared-Memory Multiprocessors", Computer Sysems Laboratory, Stanford University, CA 94305, pp. 1-14.

Gharachorloo, et al., "Architecture and Design of AlphaServer GS320", pp. 1-16.

* cited by examiner

MULTI-PROCESSOR SYSTEMS AND METHODS FOR BACKUP FOR NON-COHERENT SPECULATIVE FILLS

CROSS REFERENCE TO RELATED APPLICATIONS

This application is related to the following commonly assigned co-pending patent applications entitled: "COHERENT SIGNAL IN A MULTI-PROCESSOR SYSTEM," application Ser. No. 10/756,636; "CACHE SYSTEMS AND METHODS FOR EMPLOYING SPECULATIVE FILLS," application Ser. No. 10/756,638; "REGISTER FILE SYSTEMS AND METHODS FOR EMPLOYING SPECULATIVE FILLS," application Ser. No. 10/756,644; "SYSTEMS AND METHODS FOR EXECUTING ACROSS AT LEAST ONE MEMORY BARRIER EMPLOYING SPECULATIVE FILLS," application Ser. No. 10/756,639; "MULTI-PROCESSOR SYSTEM UTILIZING SPECULATIVE SOURCE REQUESTS," application Ser. No. 10/756,640; "MULTI-PROCESSOR SYSTEM RECEIVING INPUT FROM A PRE-FETCH BUFFER," application Ser. No. 10/756,535; "SOURCE REQUEST ARBITRATION," application Ser. No. 10/755,919; "SYSTEMS AND METHODS FOR EMPLOYING SPECULATIVE FILLS," application Ser. No. 10/755,938; "CONSISTENCY EVALUATION OF PROGRAM EXECUTION ACROSS AT LEAST ONE MEMORY BARRIER," application Ser. No. 10/756,534, all of which are filed contemporaneously herewith and are incorporated herein by reference.

BACKGROUND

Multiprocessor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable faster access to data than if accessed from the main system memory. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads or writes to a memory location it receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

Modern microprocessors employ instruction pipelines in order to increase program execution speeds. A superscalar processor is a processor that issues multiple independent instructions into multiple pipelines or execution units allowing multiple instructions to execute in parallel. A pre-fetch engine include an instruction fetch unit that fetches program instructions which are translated into micro-operands by a decoder and assigned a sequence number by a allocation unit. The instructions are streamed into multiple execution units that execute in parallel. Once executed, the instructions can be retired.

Microprocessors employ either an in-order pipeline which retires instructions in strict program order, or an out-of order pipeline which executes instructions out-of-order to increase program execution speed, but requires the re-ordering of results prior to retiring instructions. In a multi-processor system that employs a cache coherency protocol, either pipeline type will stall during an issuing of a source request as a result of a cache miss. The trend is for the ratio of the memory latency to the processor cycle time to grow in future microprocessor applications. This trend results in cache misses serviced by the system to become an increased portion of the execution time of an application.

SUMMARY

One embodiment of the present invention may comprise a multi-processor system. The multi-processor system may comprise a processor having a processor pipeline that executes program instructions with data from a speculative fill that is provided in response to a source request. The multi-processor system may comprise a backup system that retains information associated with a previous processor execution state corresponding to an instruction associated with the speculative fill. The backup system may initiate a backup of the processor pipeline to the previous processor execution state if the speculative fill is determined to be non-coherent, and the processor pipeline may continue execution of program instructions if the speculative fill is determined to be coherent.

Another embodiment of the present invention may comprise a system having a plurality of processor nodes in communication with each other. The system may comprise a source processor node that includes a processor pipeline that executes program instructions with a speculative data fill that is received in response to a source request, and a backup system that retains processor pipeline state information related to the source request. The system may employ a protocol that causes the system to provide a coherent signal that can be employed to determine if the speculative data fill is coherent. The backup system may return the processor pipeline to a previous processor execution state if it is determined that the speculative data fill is not coherent.

Still another embodiment of the invention may comprise a miss address file (MAF) entry associated with a source request provided by a source processor in a multi-processor system that employs speculative fills. The MAF entry may comprise a field that identified an address of a cache line associated with the source request, and at least one field that contains backup information that can be employed to return the source processor to a previous processor execution state in the event that a speculative data fill employed by the source processor corresponding to the source request is determined to be non-coherent.

Yet another embodiment may comprise a multi-processor system that employs a cache coherency protocol. The system may comprise means for providing a speculative data fill in response to a source request issued by a source processor, means for retaining backup information corresponding to a processor execution state at a first user program instruction, the first user program instruction corresponds to a first program instruction that employs the speculative fill data associated with the source request, means for executing program instructions associated with the source processor employing the speculative data fill, and means for returning the processor execution to a processor execution state at the first user program instruction, if it is determined that the speculative data fill contains non-coherent data.

Another embodiment may relate to a method of executing program instructions employing a speculative fill in a multi-processor system. The method may comprise executing program instructions with data from a speculative fill that is provided to a processor in response to a source request. The method may further comprise storing information corresponding to a processor execution state associated with the speculative fill, and backing the processor to the processor execution state based on the stored information, if data from the speculative fill that is employed by the processor is determined to be non-coherent.

DETAILED DESCRIPTION

This disclosure relates generally to systems and methods for processor speculation and backup in a multi-processor system. A source processor employs a speculative data fill in response to source request. A source request is a request for data associated with a cache line from the multi-processor system. The source request will be generated in response to a processor load or store instruction that experiences a cache miss, such that the requested memory block or data fill associated with a cache line does not reside in the processor's local cache. A data fill refers to a copy of a memory block associated with a given cache line. The source processor can employ one or more speculative fills or copies of the requested data to continue program instruction execution, until a coherent fill is returned from the multi-processor system. Once the coherent fill is returned, the source processor can continue execution if the speculative fill is the same as the coherent fill or backup and re-execute program instructions if the speculative fill is different from the coherent fill.

The systems and methods can operate in a multi-processor communication system that employ a coherent signal that is a separate indicator from a data fill associated with a response to a source request. The coherent signal indicates which of one or more copies of a data fill returned in response to a source request is a coherent copy of the data. A coherent copy of data is a copy that is determined to be the latest or most up to date version.

The system and methods can store state information associated with a processor execution backup state or backup point. The state information can be employed to set a cache system to a cache state associated with the processor backup point and to set a register file system to a register file state associated with the processor backup point. Many of the following examples are illustrated with respect to a backup point associated with a processor execution state at a first user program instruction, which is the first program instruction that employs data from a respective speculative fill. However, other processor backup points can be selected to return the processor to a previous execution state associated with the determination of a non-coherent speculative fill.

Figure 1:
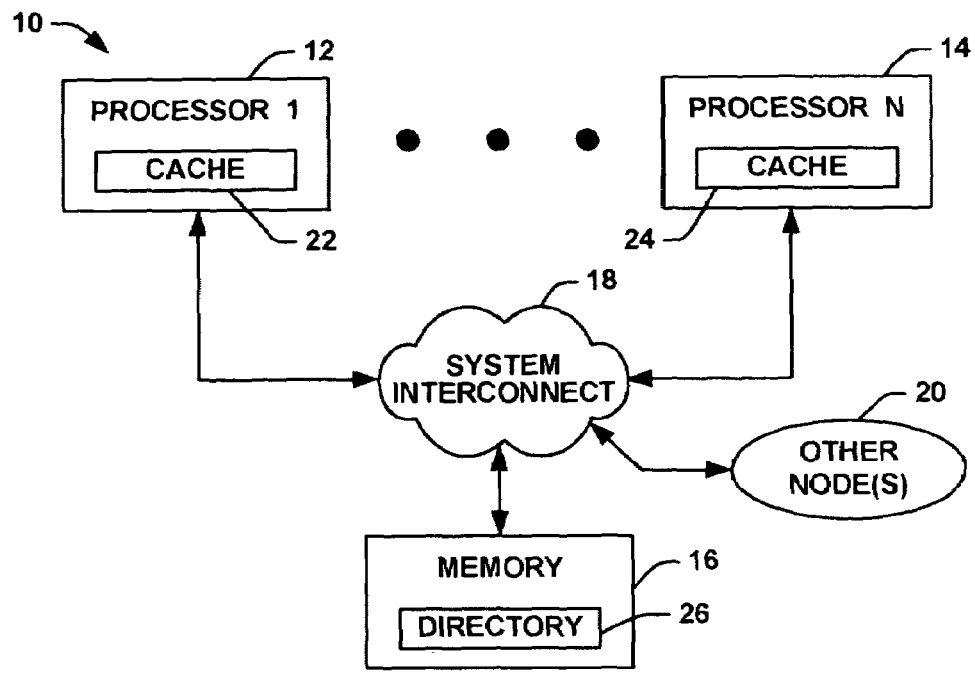
FIG. 1 depicts an example of a multiprocessor system.

FIG. 1 depicts an example of a system 10 that can employ speculative fills and backup to facilitate processor execution speed. Additionally, the system 10 can utilize a coherent signal to indicate which portion (e.g., field, block, quantum) of a given data fill is coherent. Furthermore, the system 10 can employ a coherent signal to indicate which of a plurality of responses to a plurality of requests have returned coherent copies of data fills. The system 10 illustrates a multi-processor environment that includes a plurality of processors 12 and 14 (indicated at PROCESSOR 1 through PROCESSOR N, where N is a positive integer (N>1)). The system 10 also includes memory 16, which can be implemented as a globally accessible aggregate memory. For example, the memory 16 can include one or more memory storage devices (e.g., dynamic random access memory (DRAM)).

The processors 12-14 and memory 16 define nodes in the system that can communicate with each other via requests and corresponding responses through a system interconnect 18. For example, the system interconnect 18 can be implemented as a switch fabric or a hierarchical switch. Also associated with the system 10 can be one or more other nodes, indicated schematically at 20. The other nodes 20 can correspond to one or more other multi-processor systems connected to the system interconnect 18, such as through an appropriate interconnect interface (not shown).

Each of the processors 12-14 includes at least one corresponding cache 22-24. For purposes of brevity, each of the respective caches 22-24 are depicted as unitary memory devices, although they may include a plurality of memory devices or different cache levels. Each of the caches 22-24 contains a plurality of cache lines. Each cache line has an associated address that identifies corresponding data stored in the line. The cache lines can also include information identifying the state of the data for the respective lines.

The system thus employs the caches 22-24 and the memory 16 to store blocks of data, referred to herein as "memory blocks" or "data fills". A memory block or data fill can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory 16.

The system 10 implements a cache coherency protocol to manage the sharing of memory blocks so as to guarantee coherence of data. The cache coherency protocol of the system 10 utilizes a plurality of states to identify the state of each memory block stored in a respective cache line and the memory 16. The coherency protocol establishes rules for transitioning between states, such as if data is read from or written to memory 16 or one of the caches 22-24.

As used herein, a node that issues a source request, such as a read or write request, defines a source node. Other nodes within the system 10 are potential targets of the request. Additionally, each memory block in the system 10 can be assigned a "home node" that maintains necessary global information and a data value for that memory block. The home node can be defined as a processor (or central processing unit), associated cache and associated memory/directory.

For example, when a source node, such as the processor 12, requires a copy of a given memory block, it typically first requests the memory block from its local, private cache by identifying the address associated with the memory block. If the data is found locally, the memory access is resolved without communication via the system interconnect 18. Where the requested memory block is not found locally, the source node 12 can request the memory block from the system 10, including the memory 16. In addition to the request identifying an address associated with the requested memory block, the request usually identifies the type of request or command being issued by the requester.

By way of example, assume that the processor 12 (a source node) requires a copy of data associated with a particular address, and assume that the data is unavailable from its own local cache 22. Since the processor 12 is unable to access the data in its local cache 22, the processor 12, as the source node, transmits a source request to other nodes and memory 16 via the system interconnect 18. For example, the request can correspond to a source read request for a memory block associated with the address identified in the request. The request also can identify what type of request is being issued by source node 12.

In a directory based cache coherency protocol, the source request is transmitted from the source processor 12 to a home node in the system 10. The home node retains location information (e.g., in a directory) of the owner of the requested cache line. The home node provides a forward signal to the owner. The owner then responds with a coherent data fill, which is received by the requester. The system 10 can also return a coherent signal indicating that the coherent data fill is the coherent copy of the requested cache line. The coherent signal can be provided before, after or concurrently with the coherent data fill. Based on the type of request, the cache coherency protocol can continue executing to change states of one or more copies of the memory block in the system.

During execution of the cache coherency protocol, the requesting node is provided with one or more data fills associated with the memory block. The data fill is a copy of the memory block associated with a requested cache line. The data fill can be a speculative fill. A speculative fill is a data fill that may or may not be the latest version of the memory block. Speculative fills can be provided by a local cache, a local processor (e.g., within a multi-processor group), a remote processor, a home node or a speculative guess structure. The speculative guess structure can be implemented by employing a speculative table, speculative engine or separate cache structure that maintains speculative copies of memory blocks. The speculative fills allow the requesting processor to execute several thousands of program instructions ahead prior to receiving a coherent copy of the requested memory block.

Subsequent data fills can be provided to the requesting node until the coherent signal is received indicating which data fill is coherent. These subsequent data fills can be ignored. Alternatively, if the subsequent data fill is different from the speculative fill used by the source processor to continue execution, the processor can backup and re-execute program instructions. This may be the case if it is determined that a subsequent fill is more likely coherent than the original fill employed by the processor to continue execution.

Once the coherent signal is received, the source processor can determine whether the current speculative fill employed by the processor to continue execution is the same as the coherent data fill. If the coherent data fill is different from the speculative fill, the processor can back up and re-execute program instructions with the new data. If the coherent data fill is the same as the speculative fill, the processor can continue execution, thus mitigating latency caused by the processor remaining in an idle state until a coherent version of the requested memory block is received. The source then backs up and begins executing again with the new data, but loses little or no time from the execution of the speculative fill as the source would have remained latent during the retrieval of the coherent copy regardless. The cache coherency protocol can continue executing after the coherent copy is retrieved to change states of one or more copies of the memory block in the system based on the request (e.g., read, write) of the source.

Information associated with each source request is retained in the event of a processor backup. The source processor includes a cache system that can be set to a cache state and a register file system that can be set to a register file state associated with a processor backup state in the event of execution with a non-coherent speculative fill. A pointer or index can be retained that points to a location in the cache system or a log that retains information associated with the cache state corresponding to the state of the cache at a the processor backup state. Additionally, a pointer or index can be retained that points to a location in the register file system or a log that retains information associated with the register file corresponding with the state of the register file prior to execution with a speculative data fill. If the processor employs an out-of-order pipeline, the register rename map that points to the backed up locations of the register file is operative to be reset during a processor backup.

The source processor also stores information associated with the state of the program counter of the processor pipeline at a backup point. The backup point can be a first user program instruction. The first user program instruction is the first instruction that utilizes the data requested from the store or load instruction initiated by the processor pipeline. Furthermore, the state of the register load files associated with each register load instruction prior to the first user program instruction and subsequent to the data request instruction can be retained, so that the registers can be reloaded with the new coherent data.

Figure 2:
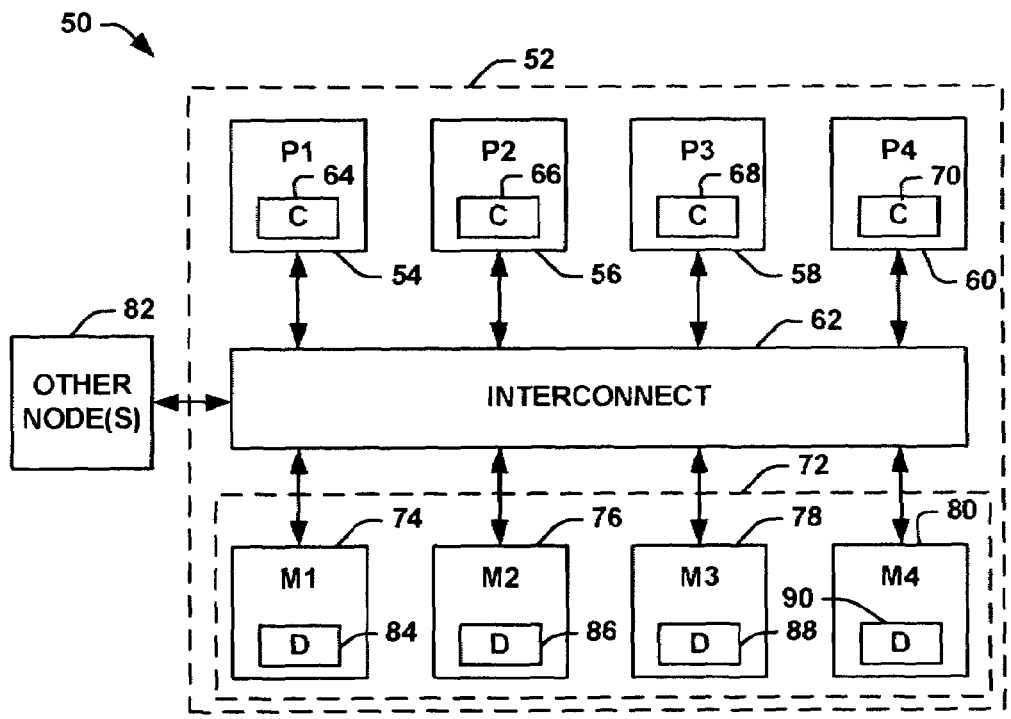
FIG. 2 depicts an example of another multiprocessor system.

FIG. 2 depicts an example of a multiprocessor computing system 50. The system 50, for example, includes an SMP (symmetric multi-processor) node 52 that includes processors (P1, P2, P3, P4) 54, 56, 58 and 60 in communication with each other via an interconnect 62. The interconnect 62 facilitates transferring data between processors and memory of the system 50. While four processors 54-60 are depicted in the example of FIG. 2, those skilled in the art will appreciate that a greater or smaller number of processors can be implemented in the node 52.

Each processor 54-60 also includes an associated cache 64, 66, 68 and 70. The caches 64-70 can enable faster access to data than from an associated main memory 72 of the node 52. The system 50 implements a cache coherency protocol designed to guarantee coherency of data in the system. By way of example, the cache coherency protocol can be implemented to include a directory based protocol in which requests for data are transmitted to a home node, which retains owner information in a directory associated with a given cache line. Alternatively, the cache coherency protocol can be implemented to include a source broadcast protocol in which a request is transmitted to all nodes in the system. Furthermore, a null-based protocol can be employed in which a home node receives a request and issues a source broadcast for the requested data.

The memory 72 can include multiple memory modules (M1, M2, M3, M4) 74, 76, 78 and 80. For example, the memory 72 can be organized as a single address space that is shared by the processors 54-60 as well as other nodes 82 of the system 50. Alternatively, each memory module 74-80 can be associated with a respective one of the processors 54-60. Each of the memory modules 72-78 can include a corresponding directory 84, 86, 88 and 90 that defines how the memory blocks are apportioned in each respective module as well as where the corresponding coherent copy of data should reside in the system 50. The coherent copy of data, for example, may reside in the home memory module or, alternatively, in a cache of one of the processors 54-60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54-60 and the memory 70, as well as those to and from the other nodes 82.

When a processor 56 requires desired data, the processor 56 operates as a source node and issues a source request (e.g., a read request or write request) to the system 50. In a directory based protocol, a home node responds to the request by providing a forwarding signal to an owner processor. The owner processor returns a coherent copy of the data fill. The cache coherency protocol implemented in the system 50 is designed to ensure that a correct copy of the data is returned in response to the source request. The system 50 can also return a coherent signal that indicates that the copy returned from the owner processor is the coherent version of the requested data.

Furthermore, the source processor can receive speculative copies or fills of the requested data in response to the source request. The source processor can employ the speculative copy to execute several thousands of instructions ahead prior to receiving a coherent version of the data. Speculative fills can be provided by a local processor (e.g., within a multi-processor group), a remote processor, a home node or a speculative guess structure, such as a speculative table, speculative engine or separate cache structure that maintains speculative copies of memory blocks. Subsequent data fills can be provided to the requesting node until the coherent signal is received indicating which data fill is coherent. These subsequent data fills can be ignored. Alternatively, if a subsequent data fill is different from the speculative fill used by the source processor to continue execution, the processor can backup and re-execute program instructions. This may be the case if it is determined that a subsequent fill is more likely coherent than the original fill employed by the processor to continue execution.

Each processor retains backup information associated with each source request in the event of a processor backup. Each processor includes a cache system and a register file system that can be set to a state associated with a processor backup state in the event of execution with a speculative fill that is non-coherent. A pointer or index can be retained that points to a location in the cache system or a log that retains information associated with a cache state at the processor backup point. Additionally, a pointer or index can be retained that points to a location in the register file system or a log that retains information associated with a register file state at the processor backup point. If the processor employs an out-of-order pipeline, the register rename map that points to the backed up locations of the register file is operative to be reset during a processor backup. The source processor also stores information associated with the state of the processor pipeline when a first user program instruction associated with the requested data is encountered. Furthermore, the state of the register load files associated with each register load instruction prior to encountering the first user program instruction can be retained, so that the registers can be reloaded with the new coherent data.

Once a coherent data fill is received in response to a source request, the source processor can determine whether the current speculative fill employed by the source processor to continue execution is the same as the coherent data fill. If the coherent data fill is different from the speculative fill, the processor can back up and re-execute program instructions with the new data. The processor can backup its associated pipeline by backing up the program counter to the first user program instruction, setting the cache to a backup point via the backup pointer or index to the cache backup system, and setting the register file to a backup point via the backup pointer or index to the register file backup system. Additionally, loaded register files can be reloaded with the coherent fill data. If the pipeline is an out-of-order pipeline, the register rename map can be reset. If the coherent data fill is the same as the speculative fill, the processor can continue execution of new program instructions without backing up.

In an alternate embodiment, a comparison is performed between bytes of the coherent data fill and the speculative fill that are employed by the processor pipeline. If none of the bytes employed by the processor pipeline are different between the speculative fill and the coherent data fill, the coherent data fill is loaded into the local cache but no backup occurs. If bytes employed by the processor pipeline are different between the speculative fill and the coherent data fill, the coherent data fill is loaded into the local cache and a backup occurs.

Figure 3:
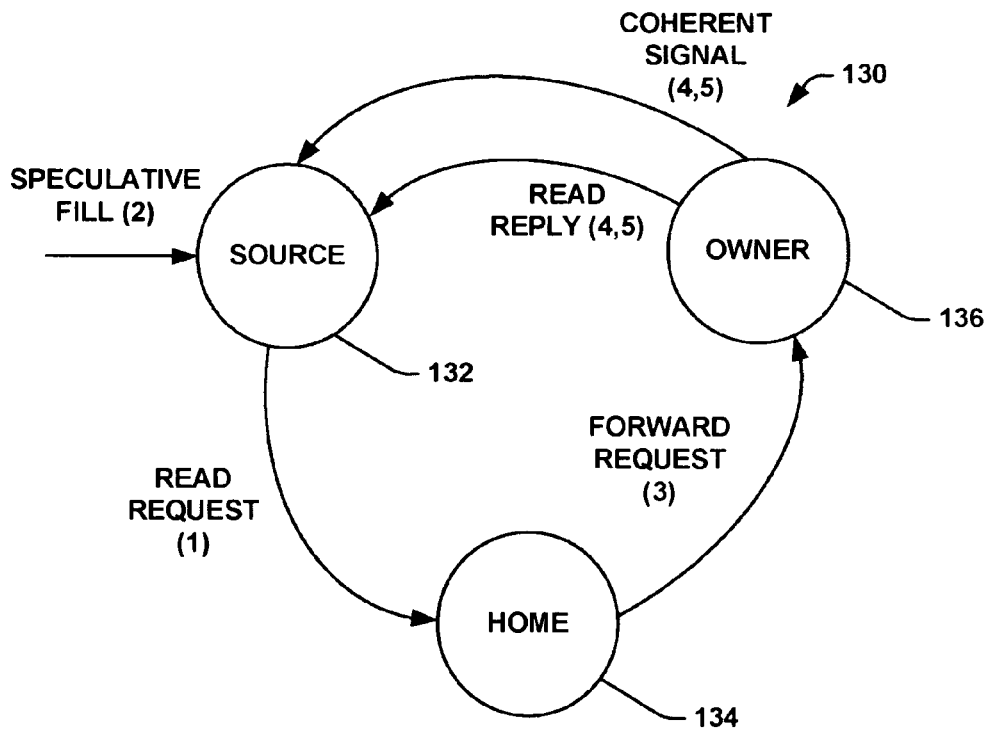
FIG. 3 illustrates a system diagram associated with a source read request.

FIG. 3 illustrates a system diagram 130 associated with a source read request in the event of a cache miss in a multi-processor system. The system diagram includes reference numerals (1-5) that indicate one or more communication orders associated with the system diagram. A source node or processor 132 initiates a read request, which is received by a home node 134. The home node 134 retains information indicating the owner of the requested cache line. This information is stored in a directory in memory associated with the home node 134. The source read request is also received by one or more other entities and/or structures of the multi-processor system. For example, one or more local processors (e.g., a processor part of a multi-processor group or node), a remote processor, or some other local or remote structure residing in a multi-processor group with the source. At least one or more of these other entities and/or structures provide copies of the requested cache line to the source. The copies of the requested cache line are referred to as speculative fills, since it is not known at this time whether or not these copies are coherent. One of the speculative fills are employed by the source processor to continue executing its program instructions. The source processor also retains information to allow the processor pipeline to backup to a previous processor execution state in the event the speculative fill employed by the processor pipeline is non-coherent.

The multi-processor system continues execution of its cache coherency protocol, while the source processor executes with the speculative fill. The home node 134 determines the owner 136 of the cache line requested from a home directory. The owner 136 of the cache line is the node or processor that has the latest version of the cache line. The latest version of the cache line can reside in a cache associated with a local or remote processor, or the latest version of the cache line can reside in memory. The owner can be a cache associated with a processor or a memory associated with the system or one or more processors. The home node 134 then provides a forward request to the owner 136. The owner 136 provides a read reply by providing a coherent copy of the requested data associated with the requested cache line to the source 132.

A coherent signal is provided to the source. The coherent signal is an indicator that provides an indication to the source that the copy provided by the owner is the coherent version of the cache line. In the example of FIG. 3, the coherent signal is provided by the owner. However, the coherent signal can be provided by control logic associated with the multi-processor system, by the home node 136 or by some other structure in the multi-processor system. The coherent signal can be a structure such as a data packet, or a tag associated with each data fill that is marked to indicate which of the data fills are coherent, or a tag associated with only the coherent version of the cache line. The coherent signal can be a mask or vector that indicated which portions (e.g., data fields, data quantums, data blocks) of a data fill are coherent. Additionally, the coherent signal can be a mask or vector that indicates which of a plurality of responses to a plurality of requests have returned coherent copies. The coherent signal can be sent prior to, after or concurrently with the coherent version of the cache line.

In response to the source receiving the coherent signal, a comparison is performed of the coherent fill and the speculative fill employed by the source to continue program execution. If the coherent data fill is different from the speculative fill, the source can back up the program counter to the first user program instruction, reset the cache, register files and register map, reload the registers associated with the requested data and re-execute program instructions with the new coherent data. If the coherent data fill is the same as the speculative fill, the source can continue execution of program instructions, which can be several thousand instructions ahead of where the program would be without employing the speculative fill.

Alternatively, a comparison can be performed between bytes of the coherent data fill and the speculative fill that are employed by the processor pipeline. If none of the bytes employed by the processor pipeline are different between the speculative fill and the coherent data fill, the coherent data fill is loaded into the local cache but no backup occurs. If bytes employed by the processor pipeline are different between the speculative fill and the coherent data fill, the coherent data fill is loaded into the cache and a backup occurs.

Figure 4:
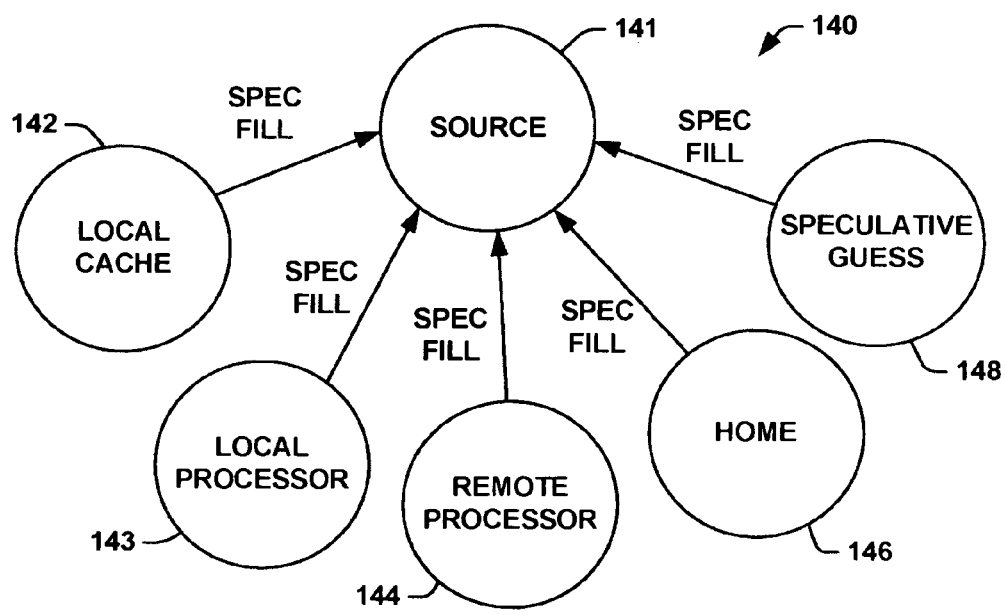
FIG. 4 illustrates a system diagram associated with a source node or processor receiving speculative fills.

FIG. 4 illustrates a system diagram 140 associated with a source node or processor 141 receiving speculative fills in response to a source request in the event of a cache miss in a multi-processor system. The source node or processor 141 can receive speculative fills from a local cache 142. The local cache 142 may have a copy of the memory block, which may or may not be the same as the coherent version residing somewhere in the multi-processor. This can occur in an upgrade miss, which by definition means that there is already a copy of the memory block in the local cache 142, such that the copy of the memory block can serve as a speculative fill. When the upgrade miss returns, a coherent signal will occur if the upgrade occurred to the value that was already present in the cache. If a new value is obtained, the new value will cause the source 141 to backup and re-execute program instruction with the new value.

Another example, is a full-block write where by definition all data values in a memory block associated with a cache line are going to be written by the execution stream. In this example, the system returns an acknowledgement that the line is coherent (all other copies have been invalidated). Similar to upgrade misses, the source begins executing upon receiving a full-block miss. When the system returns a coherent signal, the coherent signal is passed to the source 141 to allow instructions to start retiring.

The source node or processor 141 can receive speculative fills from a local processor 143. A local processor 143 is a processor that is within a node or multi-processor group with the source 141. The local processor 143 may have a copy of the cache line in its cache, which may be a stale version or a coherent version. The local processor 143 can provide this copy in the form of a speculative fill to the source. Additionally, a speculative fill can be provided by a remote processor 144 that can provide a speculative fill prior to the time necessary in providing the coherent fill. A remote processor is a processor that is not within a node or multi-processor group with the source 141. A home node 146 or processor can also provide a speculative fill.

The multi-processor system can also include a speculative guess structure 148 operative to provide speculative fills. For example, the speculative guess structure 148 can be a speculative engine can be employed to provide speculative fills in response to source requests. The speculative engine can be a dedicated processor and/or memory that returns speculative copies of cache lines. The speculative guess structure 148 can be a storage structure local to the source processor 141 that maintains speculative copies of cache lines in a table or some other form. The speculative guess structure 148 can monitor cache copies transmitted over the system, such that the speculative fills are similar to a substantial portion of the coherent fills transmitted over the system.

Figure 5:
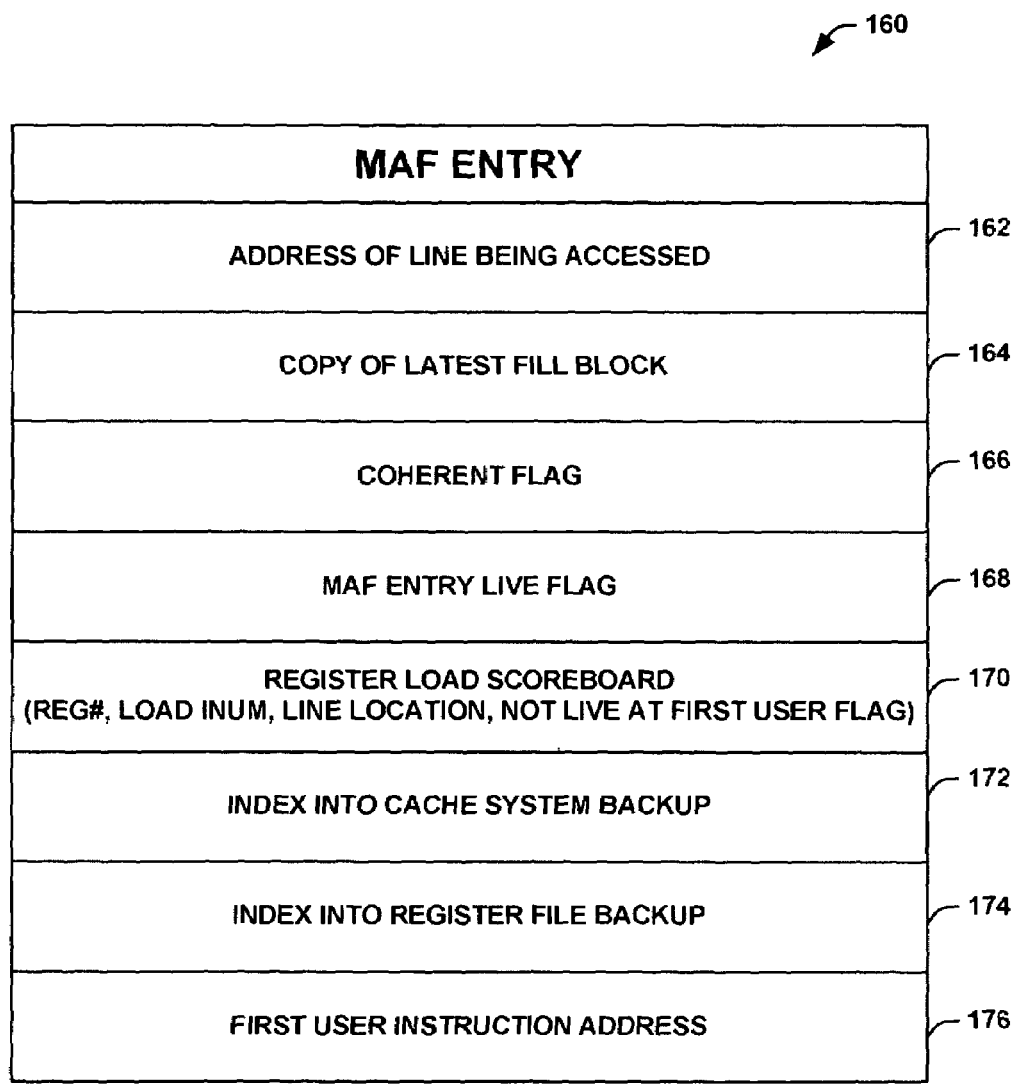
FIG. 5 illustrates a block diagram of a miss address file (MAF) entry.

FIG. 5 illustrates a block diagram of a miss address file (MAF) entry 160 that can be employed to initiate backup of a processor pipeline in the event of execution of a speculative fill that is not coherent. A MAF entry is generated by a source each time a source request for a new cache line is generated over the system. The MAF entry 160 contains fields associated with an outstanding request corresponding to a cache miss for a respective cache line. The MAF fields can include the cache line address being requested 162, the copy of the latest fill block 164 returned by the system and a coherent flag 166 that provides an indication of whether or not the coherent signal has been received.

The MAF entry 160 also includes fields for initiating a backup of the processor pipeline. The MAF entry 160 includes a MAF entry live flag field 168. The MAF entry live flag 168 indicates that a first user program instruction has been encountered by the processor pipeline. The first user program instruction is the first instruction that employs the requested data. The MAF entry 160 also includes a register load scoreboard 170. The register load scoreboard 170 includes entries for each register that is a destination of a load instruction prior to encountering the first user program instruction and subsequent to an instruction that causes the source request. Each entry in the scoreboard includes a register number, a load inum number which is a unique ascending number assigned at load time, a location in the cache line accessed by the load instruction associated with the respective register and a not live at first user flag. The not live at first user flag is a flag that indicates whether or not a register was overwritten before the first user program instruction has been encountered.

The MAF entry 160 also includes an index into the cache backup system field 172. This index can be a pointer into a log or a cache backup system associated with the state of the local cache at a backup point. The MAF entry 160 also includes an index into the register file backup system field 174. This index can be a pointer into a log or a register backup file associated with the state of the register file at a backup point associated with the processor backup state. The MAF entry 160 also includes the address of the first user program instruction field 176. The address of the first user program instruction can be employed to set the program counter to the first user program instruction.

The following program example illustrates a first user program instruction:

```
0001   Load R11, 12(R14)   # Access address formed as 12+R14 (cache
                             line 88000).
0002   Add R16, R12 -> R13
0003   Load R3, 24(R14)    # Access 24+R14 (also in cache line at 88000)
0004   Sub R6, R7 -> R2
0005   Mov R3, R8          # First use of data from cache line 88000
                            (accesses R3)
0006   Xor R8, #16, R8
0007   CMP R8, R11, R13
```

In the above example, it can be assumed that a cache miss occurs with the Load R11 instruction in line "0001" and this initiates a MAF entry for cache line 88000. When the Load R3 instruction in line "0003" is encountered a miss will also occur and is in the same cache line 88000. So a scoreboard entry will be created for the Load R3. The Mov R3 instruction in line "0005" is the first program instruction that uses either R11 or R3 and hence is the first-user program instruction in this example. However, if the Load R3 in instruction "0003" was to a different cache line than Load R11 in line "001" then the first-user program instruction would be the CMP R8, R11 in line "0007" because that is the first one to use the R11 data.

Each time a new fill is received, the source determines if the data fill in the MAF entry 160 is the same as the speculative fill utilized by the source to continue execution. If the new fill is different, the source replaces the previous data fill with the new fill. If the subsequent data fill is different from the speculative fill used by the source processor to continue execution, the processor may backup and re-execute program instructions. This may be the case if it is determined that a subsequent fill is more likely coherent than the original fill employed by the processor to continue execution.

The source also checks to see if the state of the coherent flag 166 has changed indicating that the coherent signal has been received. Once the coherent flag 166 changes state, the source can compare the coherent fill 164 stored in the MAF entry 160 with the speculative fill used to continue execution of the processor to determine if execution should continue or whether the processor needs to re-execute the program instructions with the coherent data.

If the coherent data fill is different from the speculative fill, the source can load the cache with the coherent fill, reset the cache to the backup point via the index into the cache backup system, reset the register file to the backup point via the index into the register file backup system, reset the register rename map (e.g., for an out-of-order pipeline), reload the registers based on the register scoreboard, set the program counter to the first user program instruction and re-execute program instructions with the new coherent data. If the coherent data fill is the same as the speculative fill, the source can continue execution of program instructions without the need to backup. Alternatively, a comparison can be performed of bytes from the speculative fill and the coherent fill associated with register loads in the register scoreboard. If the bytes are the same, the registers have been loaded with the correct values and a backup is not necessary. If the bytes are not the same, the registers have been loaded with the incorrect values and a backup is necessary.

Figure 6:
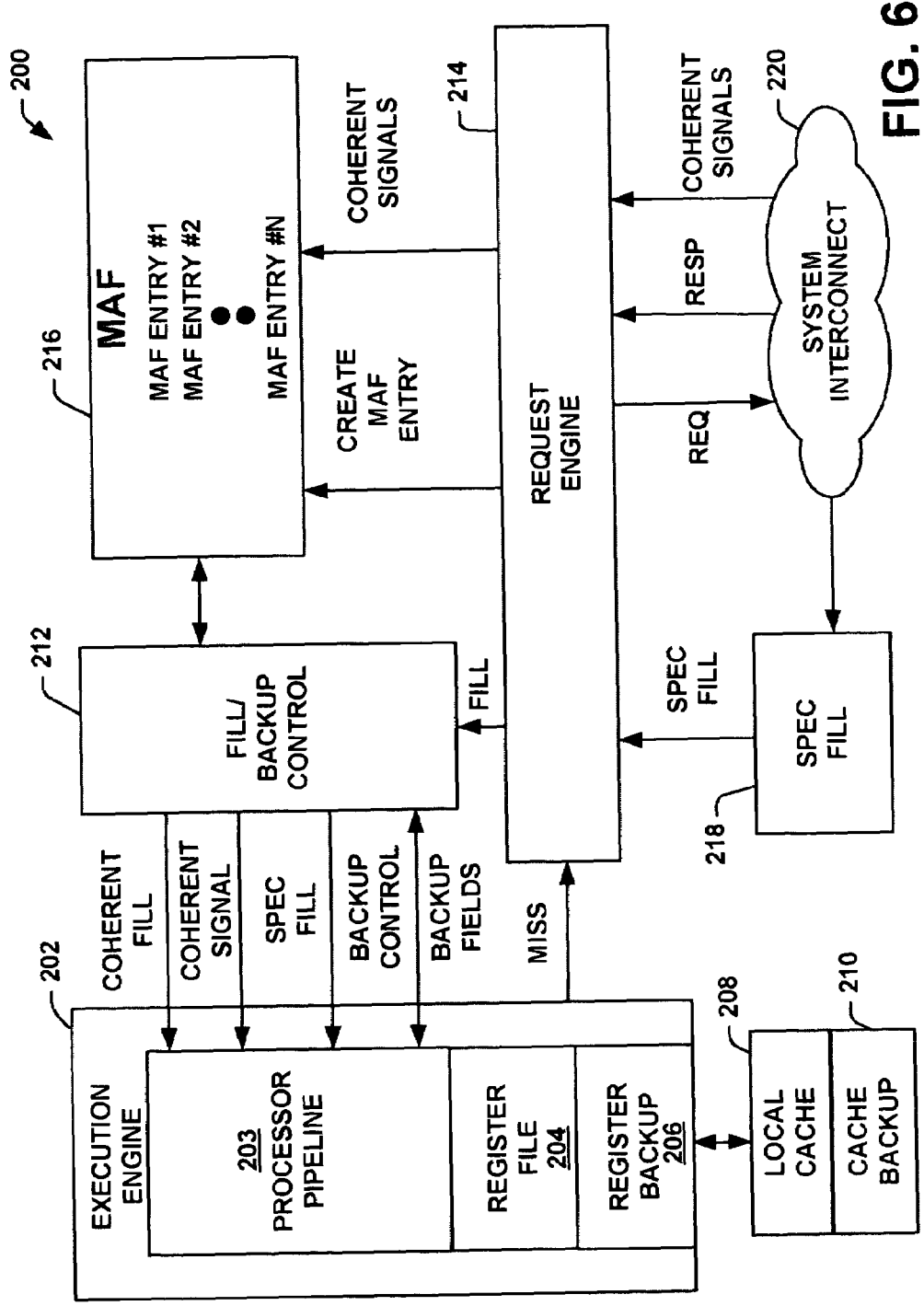
FIG. 6 depicts an example of a processor system.

FIG. 6 illustrates a processor system 200 that employs one or more MAF entries for processor speculation and backup in a multi-processor system. The system 200 includes an execution engine 202 that is executing instructions associated with a processor pipeline 203. During a load or store instruction, the execution engine 202 searches a local cache 208 to determine if the cache line associated with the load or store instruction resides in the local cache 208. If the cache line does not reside in the local cache 208, the execution engine 202 initiates a cache miss to a request engine 214. The request engine 214 determines if a previous MAF entry resides in a MAF 216. The MAF 216 can include N MAF entries, where N is an integer greater than or equal to one. Each MAF entry is associated with a source request for a cache line.

If a MAF entry associated with the cache line corresponding to the load or store instruction resides in the MAF 216, a previous unresolved source request has been issued over the system. If the processor instruction is a load instruction, the register associated with the load instruction is added to the register scoreboard associated with the previously unresolved MAF entry. Each entry in the register scoreboard includes a register number, a load inum number which is a unique ascending number assigned at load time, a location in the cache line accessed by the load instruction associated with the respective register and a not live at first user flag. The not live at first user flag is a flag that indicates whether or not a register was overwritten before the first user program instruction has been encountered.

If a MAF entry associated with the cache line corresponding to the load or store instruction does not reside in the MAF 216, the request engine 214 creates a new MAF entry and issues a source request over the system via a system interconnect 220. A MAF can be implemented as a table, an array, a linked list or other data structure programmed to manage and track requests for each cache line. The MAF entry includes fields that identify, for example, the address of the data being requested, the type of request, and response information received from other nodes in response to the request. The request engine 214 thus employs a MAF 216 having one or more MAF entries to manage requests issued by the request engine 214 as well as responses to such requests.

The MAF entry associated with a given source request also includes fields for initiating a backup of a processor pipeline. The MAF entry includes a MAF entry live flag field. The MAF entry live flag indicates that a first user program instruction has been encountered by the processor pipeline. The first user program instruction is the first instruction that employs the requested data. The MAF entry also includes an index into a cache backup system 210. This index can be a pointer into a log or a cache backup file associated with the state of the local cache 208 at a processor execution backup point. The MAF entry also includes an index into a register file backup system 206. This index can be a pointer into a log or a register backup file associated with the state of a register file 204 at a processor execution backup point. The MAF entry also includes the address of the first user program instruction. The address of the first user program instruction can be employed to backup the program counter to the first user program instruction.

A speculative fill is provided to the request engine 214 by a speculative fill structure 218 in response to a source request. The speculative fill structure 218 can be a tagless relatively large cache-like structure local or remote to the system 200. If the speculative fill structure 218 has a substantial number of entries (e.g., 32 times more entries than the local cache 204), the speculative fill structure 218 will have relatively good accuracy and a large number of speculative fills will be coherent. The entries in the speculative fill structure can be obtained by monitoring cache lines transmitted over the multi-processor system.

The speculative fill is stored in a copy of latest fill block field in the MAF entry associated with the corresponding source request via the request engine 214. A fill/backup control system 212 retrieves a copy of the speculative fill from the MAF entry and provides the speculative fill to the processor pipeline 203. The processor pipeline 203 employs the speculative fill to continue execution of program instructions. As new fills are received from the system, the fill/backup control system 212 compares the new fills with the copy of latest fill block field of the MAF entry. If the new fill is different then the copy of the latest fill is overwritten with the new fill. These subsequent data fills can be ignored by the processor pipeline, until a coherent signal is received. Alternatively, if the subsequent data fill is different from the speculative fill used by the source processor to continue execution, the processor can backup and re-execute program instructions. This may be the case if it is determined that a subsequent fill is more likely coherent than the original fill employed by the processor to continue execution.

The fill/backup control system 212 also provides an interface between the processor pipeline 203 and the MAF entry. The fill/backup control 212 analyzes the processor instructions and updates backup fields associated with the MAF entry. For example, the fill/backup control system 212 will receive backup field updates such as the address of the first user program instruction for an associated source request. The fill/backup control system 212 will store the address of the first user program instruction in the first user program instruction field and set the MAF entry live flag. The MAF entry live flag provides an indication that the first user program instruction has been encountered and that a coherent fill that does not match the speculative fill will cause a processor execution backup.

The fill/backup control system 212 will determine subsequent load instructions after the instruction that causes the source request and prior to the first user program instruction. The fill/backup control system 212 will store the register number, the inum of the load, the location in the line accessed by the load instruction and set the not live at first user flag if the register has been overwritten by another instruction before the first user-instruction, and reset the not live at first user flag if the register has not been overwritten by another instruction before the first user-instruction. The fill/backup control system 212 will also receive and store in the MAF entry an index into the cache backup system 210 and an index into the register backup system 206.

The fill/backup control system 212 monitors a coherent flag field in the MAF entry to determine if the coherent flag has changed state, which is an indication that the coherent signal has been received. Once the coherent signal is received from the system, the request engine 214 changes the state of the coherent flag field in the MAF entry.

The fill/backup control system 212 detects the change in the state of the coherent fill and retrieves a copy of the latest fill block, which corresponds to the coherent version of the data fill. The fill/backup control system 212 then compares the speculative fill provided by the fill/backup control system 212 to the processor pipeline 203 with the coherent fill.

If the coherent data fill is different from the speculative fill and the MAF entry live flag is set, the fill/backup control system 212 provides the coherent fill to the processor pipeline 203. The fill/backup control system 212 then resets the program counter with the first user program instruction address, sets the cache backup system 210 to a cache state associated with the first user program instruction via the index into the cache backup system 210, sets the register file 204 to a register file state associated with the first user program instruction via the index into the register file backup 206 and loads the new fill into the local cache 208. The fill/backup control system 212 then loads the registers in the register scoreboard with data from the coherent fill, except registers that have a not live at first user flag set. Additionally, other MAF entries are examined and any scoreboard entries or first-user program instructions occurring later than the backup point are removed for the respective MAF entries. The processor pipeline 203 can then begin executing program instructions again with the new coherent data.

If the coherent data fill is the same as the speculative fill, the fill/backup control system 212 provides the coherent signal to the processor pipeline 203 indicating that the processor pipeline 203 has already been provided with the coherent data. The processor pipeline 203 can continue execution, until another load or store instruction is encountered. The MAF entry is then removed from the MAF 216. Although the fill/backup control system 212 is illustrated as a single functional element, it is to be appreciated that the fill/backup control 212 can be one or more functional elements, such as a separate fill control and a separate backup control.

Alternatively, speculative and coherent data associated with register loads in the register scoreboard can be compared to determine if any of the registers have been loaded with non-coherent data. If the registers have been loaded with non-coherent data, then the processor is backed up as discussed above. Otherwise, the processor can continue execution with the speculative fill.

It is to be appreciated that any probes from the system, will only see data changes by truly coherently retired stores and will not see any data from stores executed based on a speculative fill. Additionally, any fence or memory barrier instruction will cause the pipeline to drain such that no memory reference after a fence or barrier will be executed until all coherent data has been resolved. Furthermore, any read or write to an input/output (I/O) control status register (CSR) will cause the pipeline to drain due to side effects associated with I/O CSRs.

Figure 7:
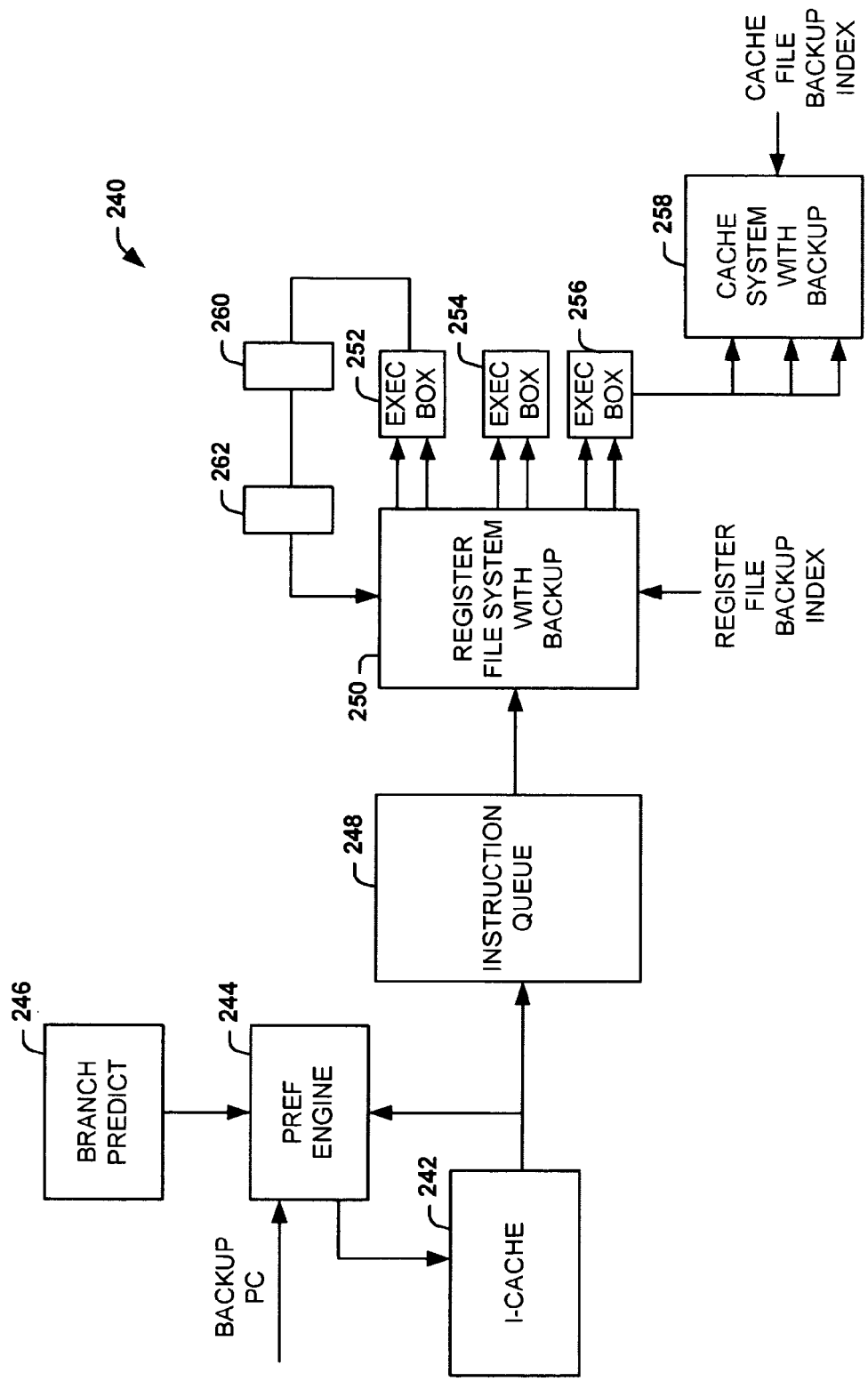
FIG. 7 depicts an example of an in-order pipeline.

FIG. 7 illustrates an in-order pipeline 240 with backup capabilities. The in-order pipeline 240 includes a branch predictor 246, a pre-fetch engine 244 that includes a program counter (not shown) and an instruction cache 242. The pre-fetch engine 244 retrieves a group of instructions that are provided to an instruction queue 248. The instructions from the instruction queue 248 cause registers to be loaded with data in a register file system with backup 250. The data to be loaded into the registers is requested from a cache system with backup 258, or in the event of a cache miss is requested from a multi-processor system. The values from the loaded register file system with backup 250 are provided to one or more execution boxes 252, 254, 256 (e.g., arithmetic logic units) which run through one or more delay boxes 260, 262, until registers can be updated based on executed results of an associated retired instruction.

The cache system with backup 258 is operative to receive a cache file backup index that points to a backup point of the cache system or a log that retains state information associated with the cache corresponding with the state of the cache at a processor execution backup state. Additionally, the register file system with backup 250 is operative to receive a register file backup index that points to a backup point of the register file system or a log that retains state information corresponding with the state of the register file at a processor execution backup state. Furthermore, the pre-fetch engine 244 is operative to receive a backup instruction that backs up the program counter to a first user program instruction.

Figure 8:
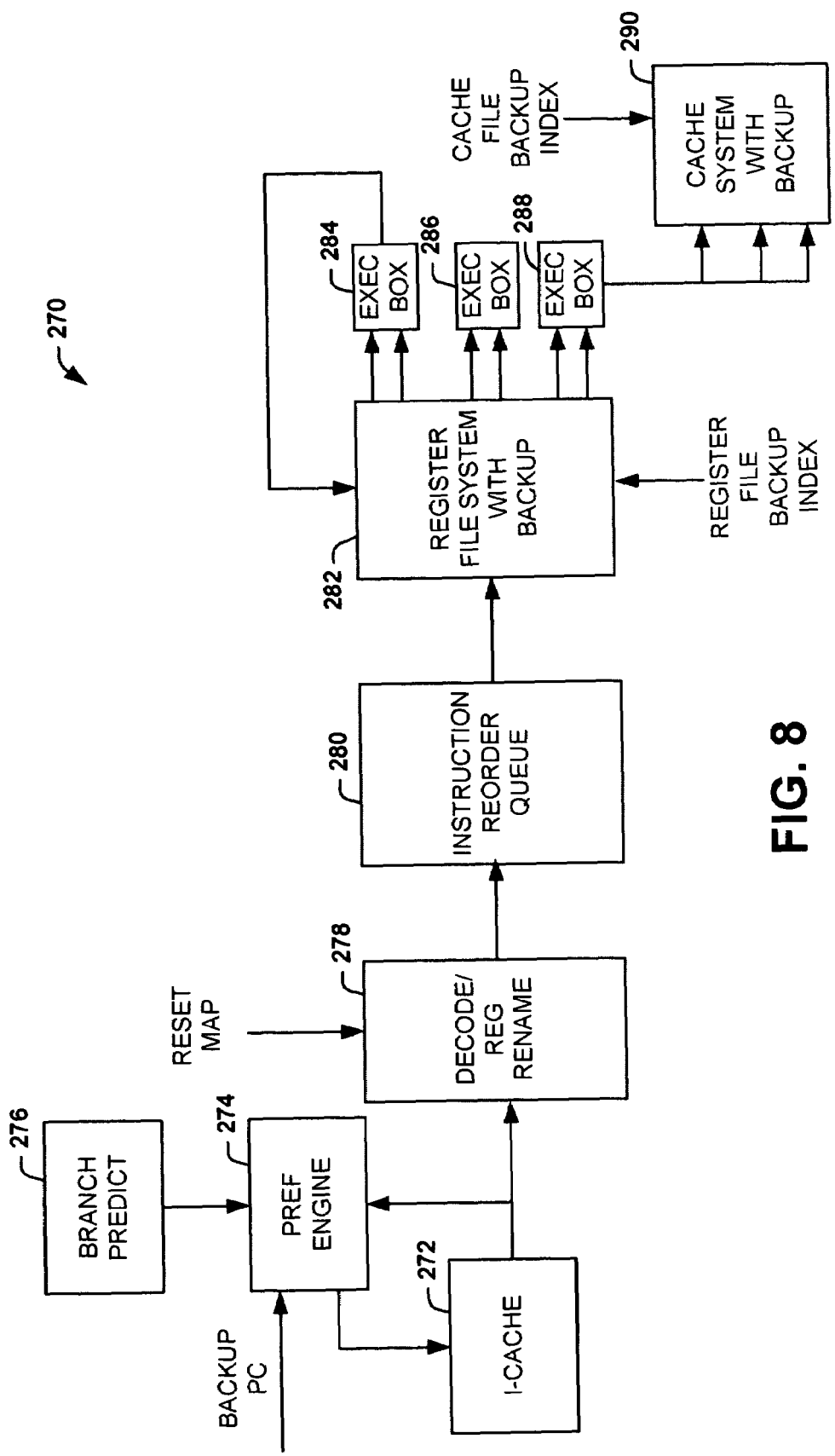
FIG. 8 depicts an example of an out-of-order pipeline.

FIG. 8 illustrates an out-of-order pipeline 270 with backup capabilities. The out-of-order pipeline 270 includes a branch predictor 276, a pre-fetch engine 274 that includes a program counter (not shown) and an instruction cache 272. The pre-fetch engine 274 retrieves a group of instructions from the instruction cache 272 that are provided to a decode/register rename map 278. The decode/register rename map 278 decodes the register instructions and maps a set of rename registers to a set of registers that can be updated once the instructions are ready to be retired. The decode/register rename component 278 provides a group of instructions to an instruction reorder queue 280. The instruction reorder queue 280 reorders the instruction to optimize execution. The instructions from the instruction reorder queue 280 cause registers to be loaded with data in a register file system with backup 282. The data to be loaded into the registers is requested from a cache system with backup 290, or in the event of a cache miss is requested from a multi-processor system. The values from the loaded register file system with backup 282 are provided to one or more execution boxes 284, 286, 288 (e.g., arithmetic logic units), until registers can be updated based on executed results of an associated retired instruction, and the register rename mapping.

The cache system with backup 290 is operative to receive a cache file backup index that points to a backup point of the cache system or a log that retains state information associated with the cache corresponding with the state of the cache at a processor execution backup point. Additionally, the register file system with backup 282 is operative to receive a register file backup index that points to a backup point of the register file system or a log that retains state information corresponding with the state of the register file prior at a processor execution backup point. Furthermore, the pre-fetch engine 274 is operative to receive a backup instruction that backs up the program counter to a first user program instruction, and the register map associated with the decode/register rename map 278 is operative to be reset in the event of a processor backup.

Figure 9:
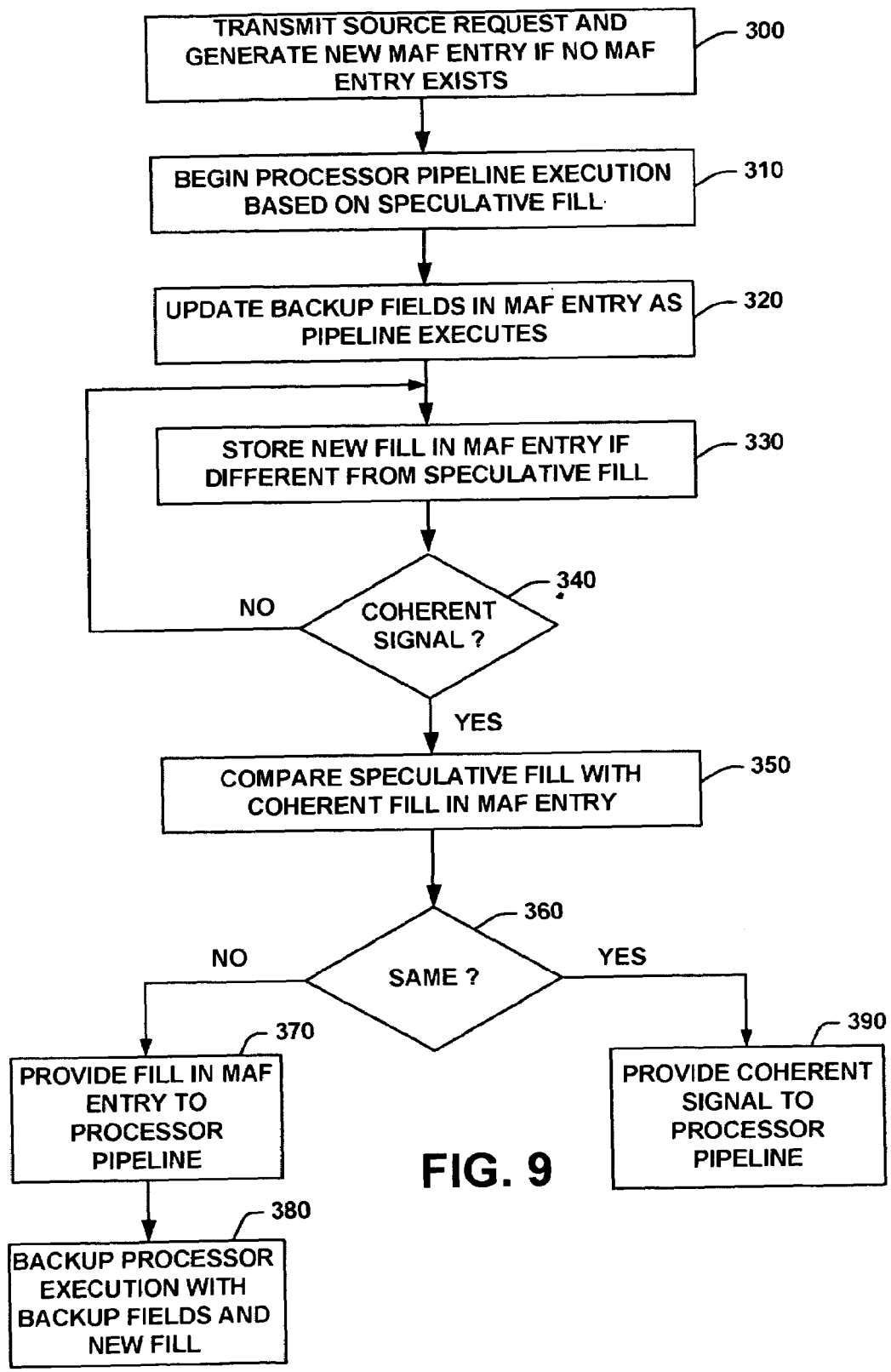
FIG. 9 depicts a method employing a speculative fill in the event of a local cache miss in a multi-processor system.
Figure 10:
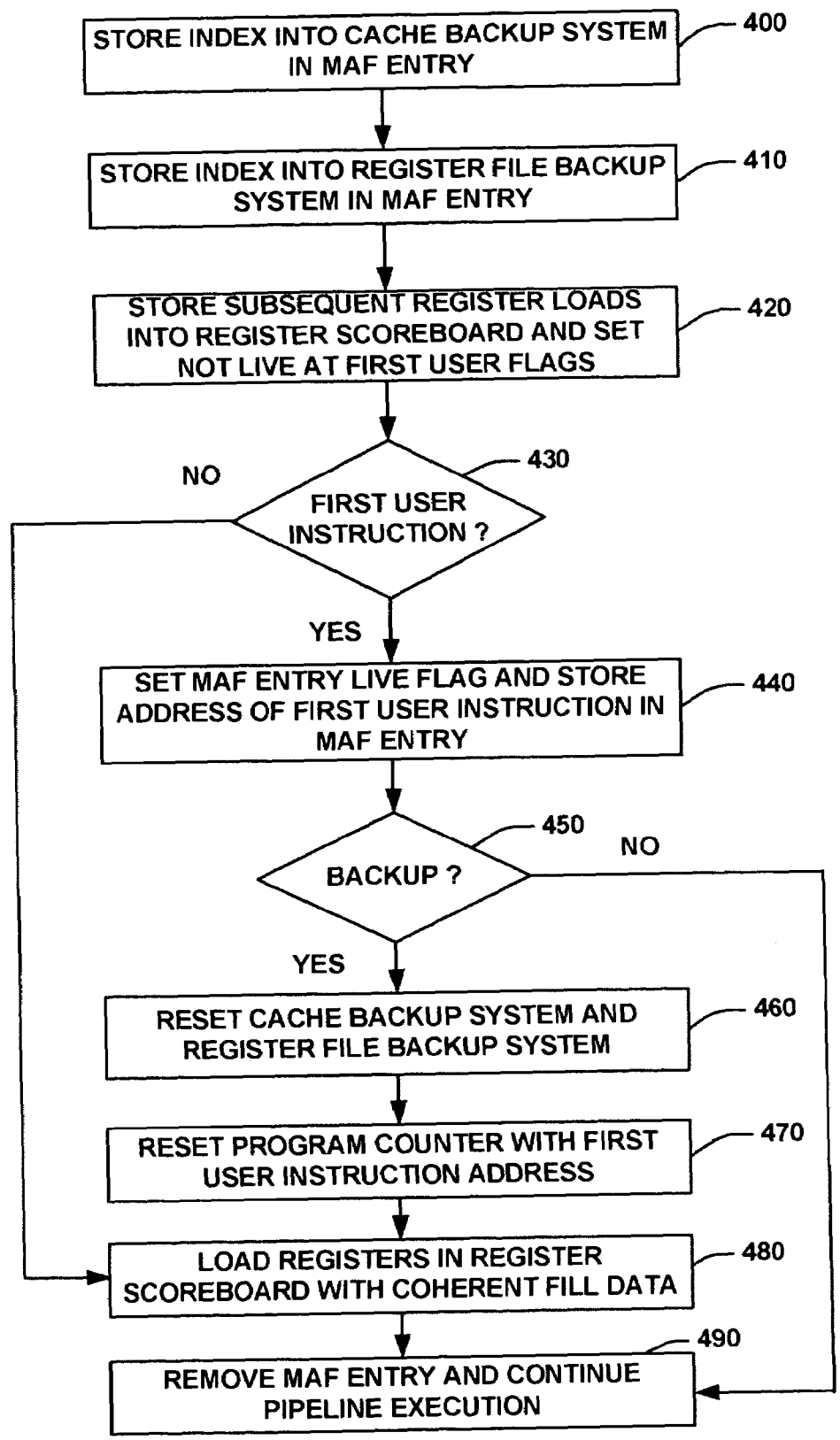
FIG. 10 depicts a method for storing backup fields for backing up a processor pipeline in the event that a speculative fill is non-coherent.
Figure 11:
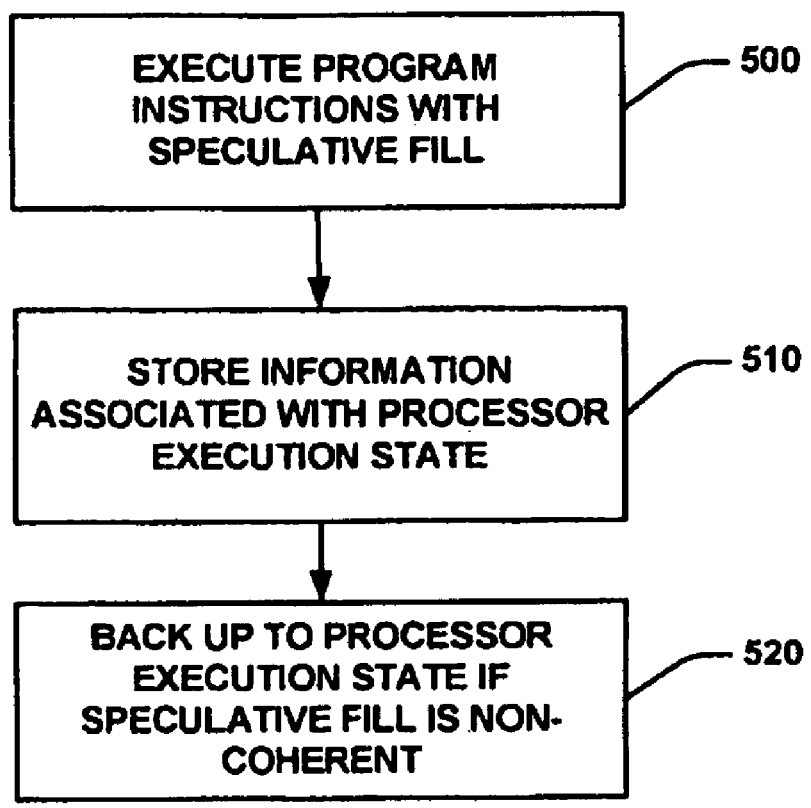
FIG. 11 depicts a flow diagram illustrating a method associated with a source request.

In view of the foregoing structural and functional features described above, certain methods will be better appreciated with reference to FIGS. 9-11. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), software (e.g., as executable instructions running on one or more processors), or any combination thereof.

FIG. 9 depicts a method employing a speculative fill in the event of a local cache miss in a multi-processor system. At 300, a source request is transmitted by a source node or processor in the event of a cache miss caused by a load or store instruction of a processor pipeline. The processor generates a new MAF entry if a previous MAF entry does not exist for that requested cache line. At 310, the source processor begins pipeline execution based on a speculative fill. The source processor can receive speculative fills from a local processor (e.g., a member of a multi-processor group), or a remote processor (e.g., non-member of a multi-processor group). The speculative fill can also be provided by a speculative guess structure operative to provide speculative fills, such as a speculative engine (e.g., dedicated processor and/or memory) that returns speculative copies of cache lines. The speculative guess structure can be a storage structure local to the source processor that maintains speculative copies of cache lines in a table or some other form. The methodology then proceeds to 320.

At 320, the backup fields in the MAF entry are updated as the processor pipeline executes. For example, an index into a cache backup system and an index into a register file backup system are stored in the MAF entry. A register entry is stored for each register that is a destination of a load instruction that accesses the same cache block as described by the MAF entry prior to the encountering of a first user program instruction and subsequent to the instruction that causes the source request. A not live at first user flag can be set for registers that are overwritten prior to encountering a first user program instruction. If the first user program instruction is encountered a MAF entry live flag is set and the address of the first user program instruction is stored in the MAF entry. The methodology then proceeds to 330.

At 330, new fills are stored in the MAF entry associated with the source request if a new fill is different than the speculative fill being executed by the processor pipeline. The source can ignore new data fills that are stored in the MAF entry if the coherent signal has not been received. Alternatively, if the new data fill is different from the speculative fill used by the source processor to continue execution, the processor can backup and re-execute program instructions. This may be the case if it is determined that a subsequent fill is more likely coherent than the original fill employed by the processor to continue execution.

At 340, the source determines if a coherent signal has been received. For example, the source can determine if a coherent signal has been received by determining if a coherent flag residing in the MAF entry has changed state. If the coherent signal has not been received (NO), the methodology returns to 330 to wait for a new fill. If the coherent signal has been received (YES), the methodology proceeds to 350. At 350, the source compares the fill stored in the MAF entry (coherent fill) with the speculative fill provided to the processor pipeline.

At 360, the methodology determines if the speculative fill employed by the processor is the same as the coherent fill. If the speculative fill is not the same as the coherent fill (NO), the methodology proceeds to 370 to provide the fill from the MAF entry to the processor pipeline. At 380, the processor pipeline execution is backed up by resetting the processor pipeline (e.g., program counter, cache, register file) to a processor execution backup point employing the backup fields in the MAF entry and loading the new coherent fill into respective registers. If the speculative fill is the same as the coherent fill (YES) at 360, the methodology proceeds to 390 to provide the coherent signal to the processor pipeline. If the processor pipeline receives a coherent signal without a new fill, the processor pipeline can continue executing.

FIG. 10 depicts a method for storing backup fields for backing up a processor pipeline in the event that a speculative fill is non-coherent. After the processor pipeline begins execution with a speculative fill associated with a source request, an index into a cache backup system is stored in a MAF entry at 400. At 410, an index into a register file backup system is also stored into the MAF entry. At 420, register names and associated information with respect to register loads prior to a first user program instruction are stored in a register scoreboard in the MAF entry. A not live at first user flag is set for any register that is overwritten prior to the first user program instruction. The methodology then proceeds to 430.

At 430, it is determined if a first user program instruction has been encountered prior to receipt of a coherent fill. If the first user program instruction has not been encountered (NO), prior to receipt of a coherent fill, the methodology proceeds to 480. At 480, the registers in the register scoreboard are reloaded with coherent data if the speculative fill is different than the coherent fill. The MAF entry is then removed and processor pipeline execution is continued at 490. If the first user program instruction has been encountered (YES) at 430, prior to receipt of a coherent fill, the methodology proceeds to 440. At 440, the MAF entry live flag is set and the address of the first user program instruction is stored in the MAF entry. The methodology then proceeds to 450.

At 450, it is determined if a backup is to be initiated. A backup is initiated if a coherent fill is received that is different than the speculative fill employed by the processor pipeline and if the MAF entry live flag is set. If a backup is not to be initiated (NO), the methodology proceeds to 490 to remove the MAF entry and to continue pipeline execution. If a backup is to be initiated (YES), the methodology proceeds to 460. At 460, the cache backup system is reset and the register file backup system is reset via respective indices stored in the MAF entry. At 470, the program counter is reset with the first user program instruction address. At 480, registers in the register scoreboard are loaded with the new coherent fill data, except for the registers with the not live at first user flag set. If the processor pipeline is an out-of-order processor pipeline, the registers rename map can be reset. The methodology then proceeds to 490 where the MAF entry is removed and the pipeline continues execution. Additional MAF entries are examined and any scoreboard entries or first user program instruction occurring later than the backup point are removed from the corresponding MAF entry scoreboard.

FIG. 11 depicts a method for executing a source request. At 500, program instructions are executed with a speculative fill that is provided to a processor in response to a source request. At 510, information is stored corresponding with a processor execution state associated with the speculative fill. At 520, the processor is backed up to the processor execution state, if the speculative fill is determined to be non-coherent.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multi-processor system that conforms to a cache coherency protocol, the system comprising:
    a processor that transmits a source request for a data fill associated with a cache line in response to a cache miss, the processor having a processor pipeline that executes program instructions with data from a given speculative fill of at least two a speculative fills that are received from two or more other processors of the multi-processor system in response to a source request, the speculative fills being copies of the requested data fill that have undetermined coherency states; and
    a backup system that retains information associated with a previous processor execution state corresponding to an instruction associated with the given speculative fill, the backup system initiating a backup of the processor pipeline to the previous processor execution state if the speculative fill is determined to be non-coherent, and the processor pipeline continuing execution of program instructions if the given speculative fill is determined to be coherent.

2. The system of claim 1, wherein the backup system further comprises a register file backup system that retains register file state information associated with the previous processor execution state.

3. The system of claim 2, wherein the backup system retains an index associated with the register file backup system to return the register file to a register state associated with the previous processor execution state.

4. The system of claim 1, wherein the backup system further comprises a cache backup system that retains cache state information associated with the previous processor execution state.

5. The system of claim 4, wherein the backup system retains an index associated with the cache backup system to return the cache to a cache state associated with the previous processor execution state.

6. The system of claim 1, wherein the backup system retains a first user program instruction address corresponding to a first program instruction that employs data associated with the source request, the backup system setting a program counter of the processor pipeline to enable the processor pipeline to execute from the first user program instruction address if the given speculative fill is determined to be non-coherent.

7. The system of claim 6, wherein the backup system retains a register file list that determines which registers of a plurality of registers are destination of a program load instruction after a program instruction that causes the source request and prior to the first user program instruction, the backup system loading registers on the register file list with coherent fill data if it is determined that the given speculative fill is non-coherent.

8. The system of claim 1, wherein the processor receives a coherent data fill from the multi-processor system after the at least two speculative fills are received in response to the source request.

9. The system of claim 1, wherein the processor receives a coherent signal generated by the multi-processor system that provides an indication of which data fill received by the processor is the coherent data fill.

10. The system of claim 1, wherein the processor further comprises a request engine that generates a miss address file (MAF) entry associated with the source request, the MAF entry having a plurality of fields that retain backup information that is employed by the backup system in the event that a backup is initiated.

11. The system of claim 10, wherein the plurality of fields further comprises an index into a cache backup system, an index into a register file backup system and a first user program instruction address corresponding to a first program instruction that employs data from the given speculative fill.

12. The system of claim 11, wherein the plurality of fields further comprising a register file scoreboard that determines which registers are destinations of a load instruction after a program instruction that causes the source request and prior to the first program instruction that employs data from the given speculative fill.

13. The system of claim 12, wherein the backup system initiates a backup if speculative fill data loaded in registers listed in the register file scoreboard contains non-coherent data.

14. The system of claim 12, wherein the register scoreboard comprises a plurality of entries associated with the registers that are destinations of a load instruction, each of the plurality of entries include a register number, a unique number assigned at decode time, a location in a cache line being accessed by a corresponding load instruction associated with the source request and a not live at first user flag that indicates which registers have been overwritten by other program instructions before the first user program instruction is encountered.

15. The system of claim 14, further comprising at least one additional MAF entry associated with at least one additional subsequent request, the backup system removing register entries and first user program instruction addresses that occur later than the first user address instruction of the MAF entry in the event the backup system initiates a backup.

16. The system of claim 10, wherein the plurality of fields further comprises a data fill field that retains a copy of a latest data fill associated with the source request and a coherent flag field that indicates if a coherent signal has been received by the processor.

17. The system of claim 16, wherein the backup system retrieves a copy of the latest data fill associated with a coherent data fill in response to a change in state of the coherent flag, and compares the copy of the coherent data fill with the given speculative fill provided to the processor pipeline, the backup system provides the copy of the coherent data fill and the plurality of fields that retain backup information to the processor pipeline if the given speculative fill is not the same as the coherent data fill and provides the coherent signal to the processor pipeline if the given speculative fill is the same as the coherent data fill.

18. The system of claim 1, wherein the processor pipeline comprises an out-of-order pipeline having a register rename map, the backup system resetting the register rename map if a backup is initiated.

19. A system comprising:
a plurality of processor nodes in communication with each other;
wherein one of the plurality of processor nodes comprises a source processor node comprising:
a processor pipeline that executes program instructions with a given speculative data fill of at least two speculative data fills received from two or more other processor nodes of the plurality of processor nodes in response to a source request for a data fill associated with a cache line issued by the source processor node in response to a cache miss, wherein the at least two speculative data fills are copies of the requested data fill that have undetermined coherency states; and
a backup system that retains processor pipeline state information related to the source request; and
the system employing a coherency protocol that causes the system to provide a coherent signal employed by the source processor to determine if the given speculative data fill is coherent, wherein the backup system returns the processor pipeline to a previous processor execution state if it is determined that the given speculative data fill is not coherent.

20. The system of claim 19, the backup system comprising:
a register file backup system that retains register file state information associated with the previous processor execution state;
a cache backup system that retains cache state information associated with the previous processor execution state; and
the processor pipeline being operative to return to a program instruction related to the source request.

21. The system of claim 20, wherein the previous processor execution state comprises a state where the processor pipeline is at a first user program instruction, the first user program instruction corresponds to a first program instruction that employs the given speculative fill.

22. The system of claim 21, wherein the backup system, in the event that the given speculative fill is determined to be non-coherent, provides a coherent data fill to a local cache, sets the register file backup system to a register file state associated with the previous processor execution state employing the register file state information, sets the cache backup system to a cache state associated with the previous processor execution state employing the cache state information, loads registers with coherent fill data that are destination of a load instruction after a load instruction that causes the source request and prior to the first user program instruction, and sets a program counter of the processor pipeline to the first user program instruction to initiate re-execution of program instructions with the coherent fill data.

23. The system of claim 20, wherein the given speculative data fill is non-coherent if it is determined that registers loaded with data from the given speculative data fill contain non-coherent data.

24. The system of claim 23, wherein the register file state information is stored in a log associated with the register file backup system and the cache state information in stored in a log associated with the cache backup system.

25. The system of claim 19, wherein the source processor node generates a miss address file (MAF) entry associated with the source request, the MAF entry having at least one field for storing backup information, wherein the backup system employs the stored backup information for returning to a state of the processor pipeline related to the source request in the event that the given speculative fill is determined to be non-coherent.

26. A multi-processor system that conforms to a coherency protocol and employs speculative data fills, the system comprising:
a source processor that transmits a source request for a data fill associated with a cache line in response to a cache miss, the source processor receiving at least two speculative data fills from two or more other processors of the multiprocessor system, the source processor generating a miss address file (MAF) entry associated with the source request, the MAF entry comprising:
a field that identifies an address of a cache line associated with the source request; and
at least one field that contains backup information that can be employed to return the source processor to a previous processor execution state if a given speculative data fill of the at least two speculative data fills employed by the source processor is determined to be non-coherent, wherein the speculative data fills are copies of the requested data fill that have undetermined coherency states.

27. The MAF entry of claim 26, wherein the at least one field comprises a field that contains an index into a cache backup system associated with the previous processor execution state, a field that contains an index into a register file backup system associated with the previous processor execution state, a field that contains a first user program instruction address corresponding to a first user program instruction that employs speculative fill data of the given speculative data fill, and a MAF entry live flag that indicates that a first user program instruction has been encountered, such that a determination that the given speculative data fill is non-coherent will cause the source processor to backup to the previous processor execution state employing the at least one field.

28. The MAF entry of claim 26, wherein the at least one field comprises a register file scoreboard that contains a plurality of entries to store register numbers that are destinations of a load instruction after a load instruction that causes the source request and prior to the first user program instruction that employs data associated with the source request.

29. The MAF entry of claim 28, wherein each of the plurality of entries comprises a register number, a unique number assigned at decode time, a location in a cache line being accessed by the corresponding load instruction associated with the source request and a not live at first user flag that indicates which registers have been overwritten by another instruction before the first user program instruction is encountered.

30. The MAF entry of claim 26, wherein the at least one field further comprises a data fill field for storing at least one data fill received in response to a source request and a coherent flag field that indicates if a coherent signal has been received by the source processor, the coherent signal indicating if a coherent data fill has been provided in response to a source request.

31. A multi-processor system that employs a cache coherency protocol, the system comprising:
    means for providing at least two speculative data fills to a source processor from two or more other processors of the multi-processor system in response to a source request for a data fill associated with a cache line issued by the source processor in response to a cache miss, wherein the at least two speculative data fills are copies of the requested data fill and have undetermined coherency states;
    means for retaining backup information corresponding to a processor execution state at a first user program instruction, the first user program instruction corresponds to a first program instruction that employs a given speculative data fill of the at least two speculative data fills associated with the source request;
    means for executing program instructions associated with the source processor employing the given speculative data fill; and
    means for returning the processor execution to a processor execution state at the first user program instruction, if it is determined that the given speculative data fill contains non-coherent data.

32. The system of claim 31, wherein the means for returning the processor execution comprises returning the means for executing program instructions to a first user program instruction address, returning a cache to a cache state corresponding to the first user program instruction, and returning a register file to a register file state corresponding to a first user program instruction employing the backup information.

33. The system of claim 31, wherein the means for retaining backup information associated with the processor execution state comprising means for retaining a register file state and a cache state corresponding to the first user program instruction.

34. A method of executing program instructions employing a speculative fill in a multi-processor system that conforms to a coherency protocol, the method comprising:
    executing program instructions with data from a given speculative fill of at least two speculative fills that are provided to a processor from one or more other processors of the multi-processor system in response to a source request for a data fill associated with a cache line issued by the processor in response to a cache miss, wherein the at least two speculative fills are copies of a requested data fill that have undetermined coherency states;
    storing information corresponding to a processor execution state associated with the given speculative fill; and
    backing the processor to the processor execution state based on the stored information, if data from the given speculative fill that is employed by the processor is determined to be non-coherent.

35. The method of claim 34, wherein the storing information comprises storing an address associated with a first user program instruction corresponding to a first program instruction that employs data associated with the given speculative fill, and the backing the processor to the processor execution state comprises resetting a processor program counter to the first user program instruction address.

36. The method of claim 35, wherein the storing information associated with a processor execution state related to an instruction that initiates the source request comprises storing register file state information and cache state information based on the processor execution state.

37. The method of claim 36, wherein the backing the processor to the processor execution state comprises resetting the processor to the first user program instruction, resetting the register file based on the register file state information and resetting the cache based on the cache state information.

38. The method of claim 34, further comprising:
    generating a miss address file (MAF) entry associated with the source request; and
    storing information associated with the processor execution state in at least one field in the MAF entry.

39. The method of claim 38, wherein the MAF entry comprises a field associated with a first user program instruction address corresponding to a first instruction that employs data associated with the given speculative fill, a field associated with a state of a register file at the processor execution state and a field associated with a state of a local cache at the processor execution state.

40. The method of claim 34, wherein the backing the processor to the processor execution state further comprises resetting a register rename map.

41. The method of claim 34, further comprising backing the processor to the processor execution state if data loaded into registers, prior to a first user program instruction and subsequent to the instruction that invokes initiation of the source request, is determined to contain non-coherent data.

* * * * *

UNITED STATES PATENT AND TRADEMARK OFFICE
CERTIFICATE OF CORRECTION

| | | |
|---|---|---|
| PATENT NO. | : 7,406,565 B2 | Page 1 of 1 |
| APPLICATION NO. | : 10/756637 | |
| DATED | : July 29, 2008 | |
| INVENTOR(S) | : Simon C. Steely, Jr. et al. | |

It is certified that error appears in the above-identified patent and that said Letters Patent is hereby corrected as shown below:

In column 17, line 60, in Claim 1, after "two" delete "a".

Signed and Sealed this

Fourteenth Day of October, 2008

JON W. DUDAS
*Director of the United States Patent and Trademark Office*